United States Patent
Liu (10) Patent No.: US 6,959,938 B1
(45) Date of Patent: Nov. 1, 2005

(54) FOLDING COLLAPSIBLE BABY TRAILER

(76) Inventor: Ssu-Liu Liu, 2F., No. 44, Lane 11, Kuang Fu N. Rd., Taipei (TW)

( * ) Notice: Subject to any disclaimer, the term of this patent is extended or adjusted under 35 U.S.C. 154(b) by 169 days.

(21) Appl. No.: 10/436,278

(22) Filed: May 13, 2003

(51) Int. Cl.[7] ............................................. B62K 27/00
(52) U.S. Cl. ...................... 280/204; 280/292; 280/656
(58) Field of Search ................................ 280/204, 202, 280/401, 415.1, 292, 656, 47.36, 47.38, 30, 280/63, 400

(56) References Cited

U.S. PATENT DOCUMENTS

| | | | | |
|---|---|---|---|---|
| 5,020,814 A | * | 6/1991 | George et al. | 280/204 |
| 5,454,577 A | * | 10/1995 | Bell | 280/204 |
| 5,474,316 A | * | 12/1995 | Britton | 280/204 |
| 5,577,746 A | * | 11/1996 | Britton | 280/204 |
| 5,669,618 A | * | 9/1997 | Chiu | 280/204 |
| 5,785,333 A | * | 7/1998 | Hinkston et al. | 280/204 |
| 5,829,771 A | * | 11/1998 | Hsu | 280/204 |
| 5,947,497 A | * | 9/1999 | Hsu | 280/204 |

* cited by examiner

Primary Examiner—Christopher P. Ellis
Assistant Examiner—Kelly E Campbell
(74) Attorney, Agent, or Firm—Troxell Law Office, PLLC (57) ABSTRACT

A folding collapsible baby trailer is disclosed to include a bottom frame, two upright side frame, a transverse top bar, and a trailer bar, the bottom frame being formed of two side bars, a front bar and a rear bar, the front bar and rear bar of the bottom frame being substantially ⊔-shaped bars each having an elongated body disposed on the middle below the elevation of the side bars of the bottom frame and two angled end portions respectively extended from two ends of the elongated body and respectively pivoted to distal ends of the first and second upright side frames so that a flat horizontal space is defined above the elongated bodies of the front and rear bars of the bottom frame and below the elevation of the side bars of the bottom frame for receiving the transverse top bar and the upright side frames when the folding collapsible baby trailer collapsed.

2 Claims, 15 Drawing Sheets

FOLDING COLLAPSIBLE BABY TRAILER

BACKGROUND AND SUMMARY OF THE INVENTION

The present invention relates to a baby trailer to be pulled by a baby tricycle or the like and, more particularly, to a folding collapsible baby trailer.

Various folding collapsible baby trailers have been disclosed and have appeared on the market. These conventional folding collapsible baby trailers commonly comprise a fixed bottom frame, two upright side frames, and a transverse top bar. The bottom frame is comprised of two parallel side bars, a front bar fixedly connected between the side bars at the front side, and a rear bar fixedly connected between the side bars at the rear side. Because the front and rear bars and the side bars are disposed at the same elevation, the upright side frames and the transverse top bar are stacked above the base frame when collapsed. The protruded upright side frames and transverse top bar of the collapsed status of the folding collapsible baby trailer may damage the packing box during transportation.

The present invention has been accomplished to provide a folding collapsible baby trailer, which eliminates the aforesaid problem. According to one aspect of the present invention, the folding collapsible baby trailer is comprised of a bottom frame, two upright side frames, a transverse top bar, and a trailer bar. The bottom frame is formed of two side bars, a front bar and a rear bar. The front bar and rear bar of the bottom frame are substantially ⊔-shaped bars, each having an elongated body disposed on the middle below the elevation of the side bars of the bottom frame and two angled end portions respectively extended from two ends of the elongated body and respectively pivoted to distal ends of the first and second upright side frames so that a flat horizontal space is defined above the elongated bodies of the front and rear bars of the bottom frame and below the elevation of the side bars of the bottom frame for receiving the transverse top bar and the upright side frames when the folding collapsible baby trailer collapsed. According to another aspect of the present invention, the elongated body of the front bar of the bottom is disposed lower than the side bars so that a child can get in the folding collapsible baby trailer conveniently without kicking the front bar.

DETAILED DESCRIPTION OF THE INVENTION

Referring to FIGS. from 1 through 15, a folding collapsible baby trailer 10 is shown comprising a bottom frame 1, a first upright side frame 2, a second upright side frame 3, a transverse top bar 4, and a trailer bar 5.

Figure 1:
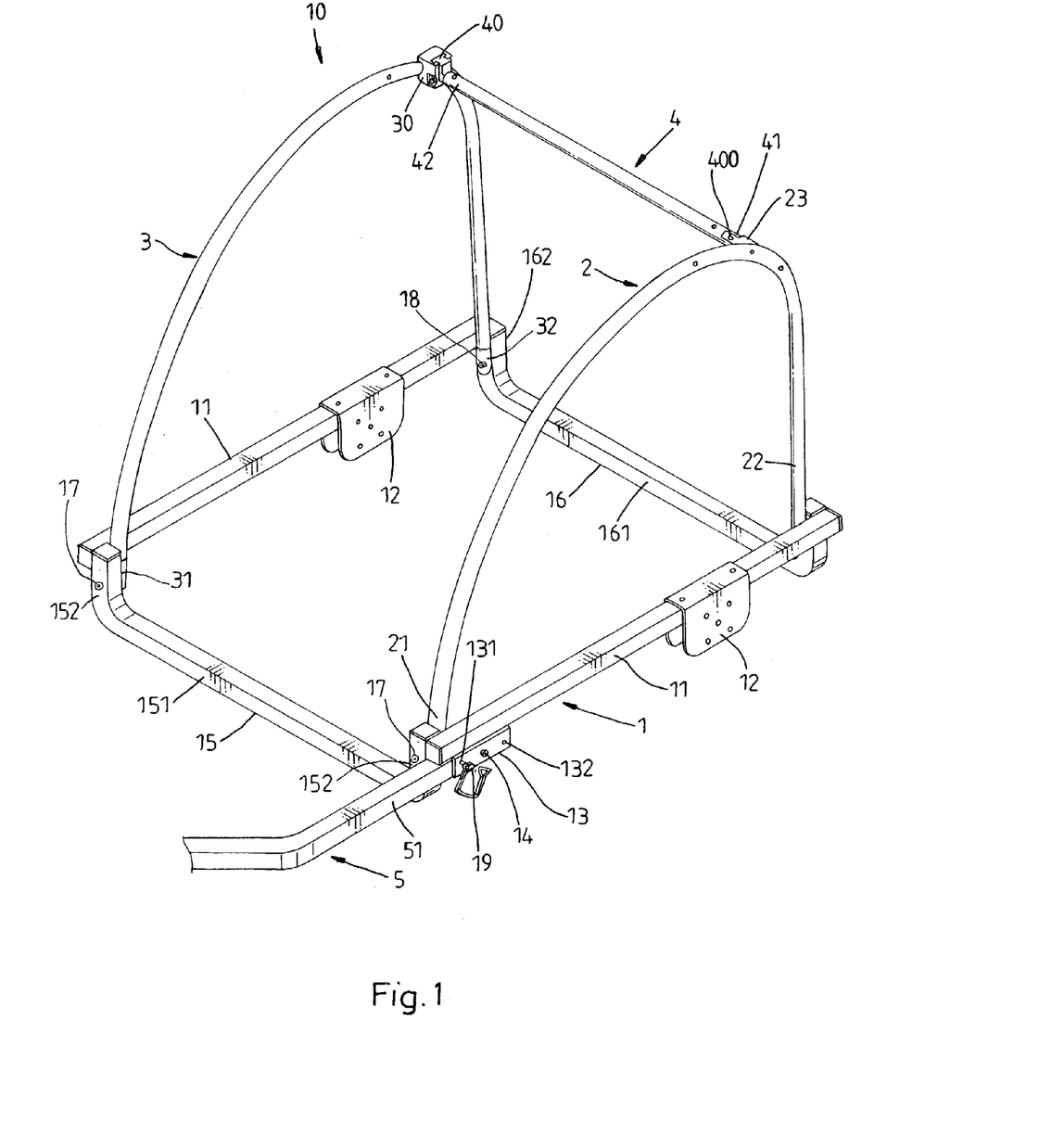
FIG. 1 is an elevational view of the frame structure of a folding collapsible baby trailer according to the present invention.
Figure 2:
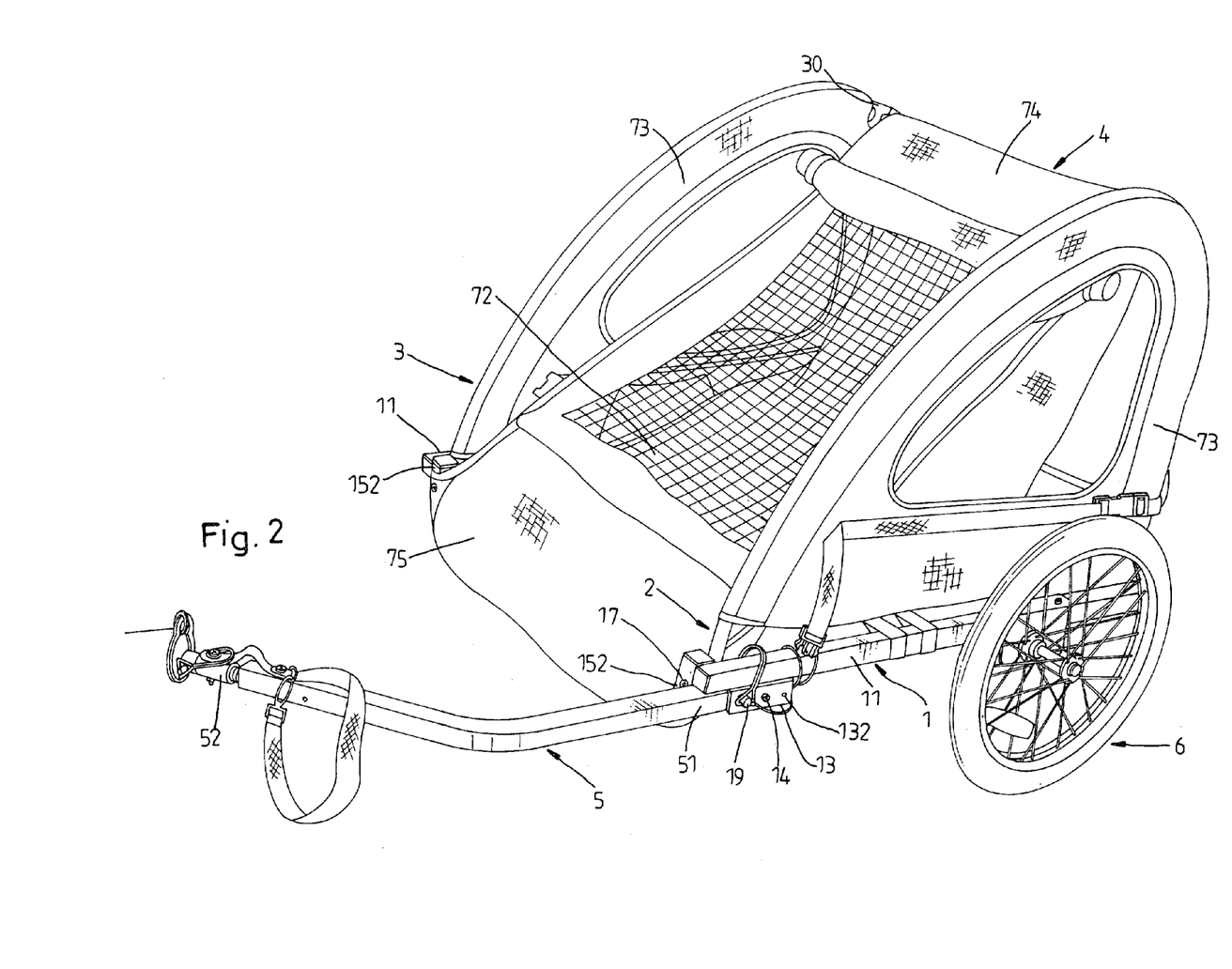
FIG. 2 is an elevational view of the folding collapsible baby trailer according to the present invention.
Figure 3:
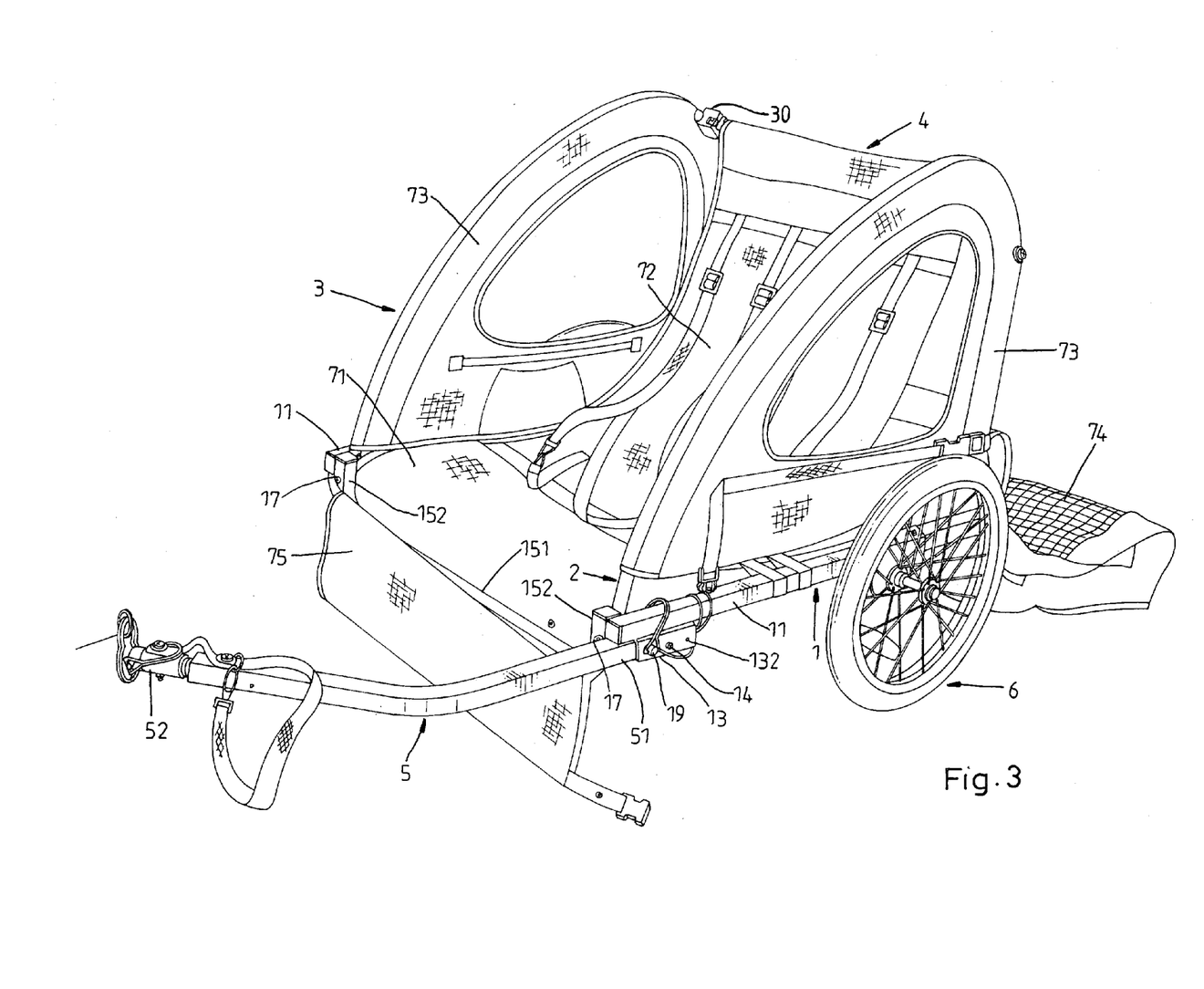
FIG. 3 is similar to FIG. 2 but showing the cloth canopy and a front cover sheet opened.
Figure 4:
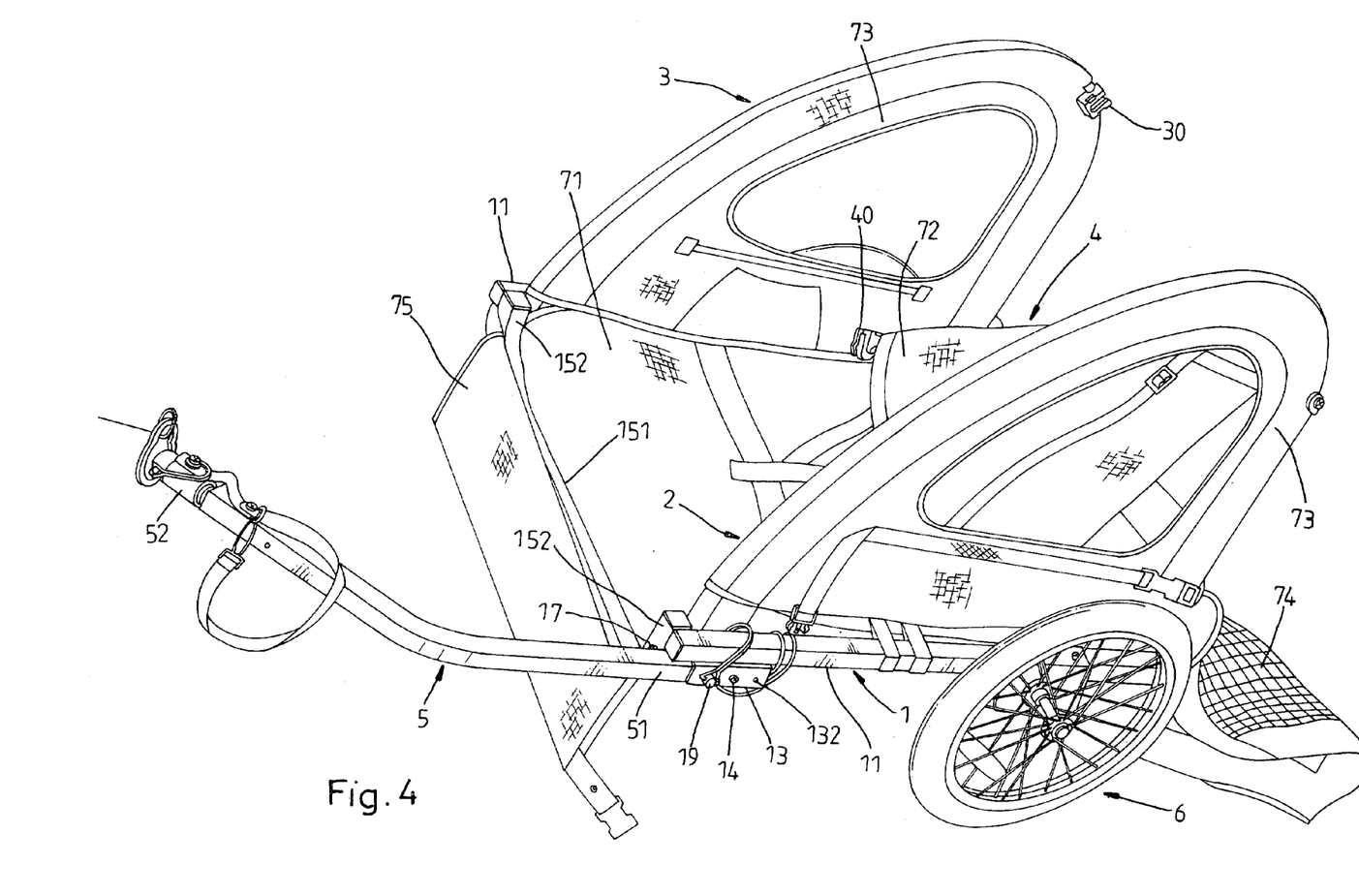
FIG. 4 is similar to FIG. 3 but showing the transverse top bar disconnected from the second upright side frame.
Figure 5:
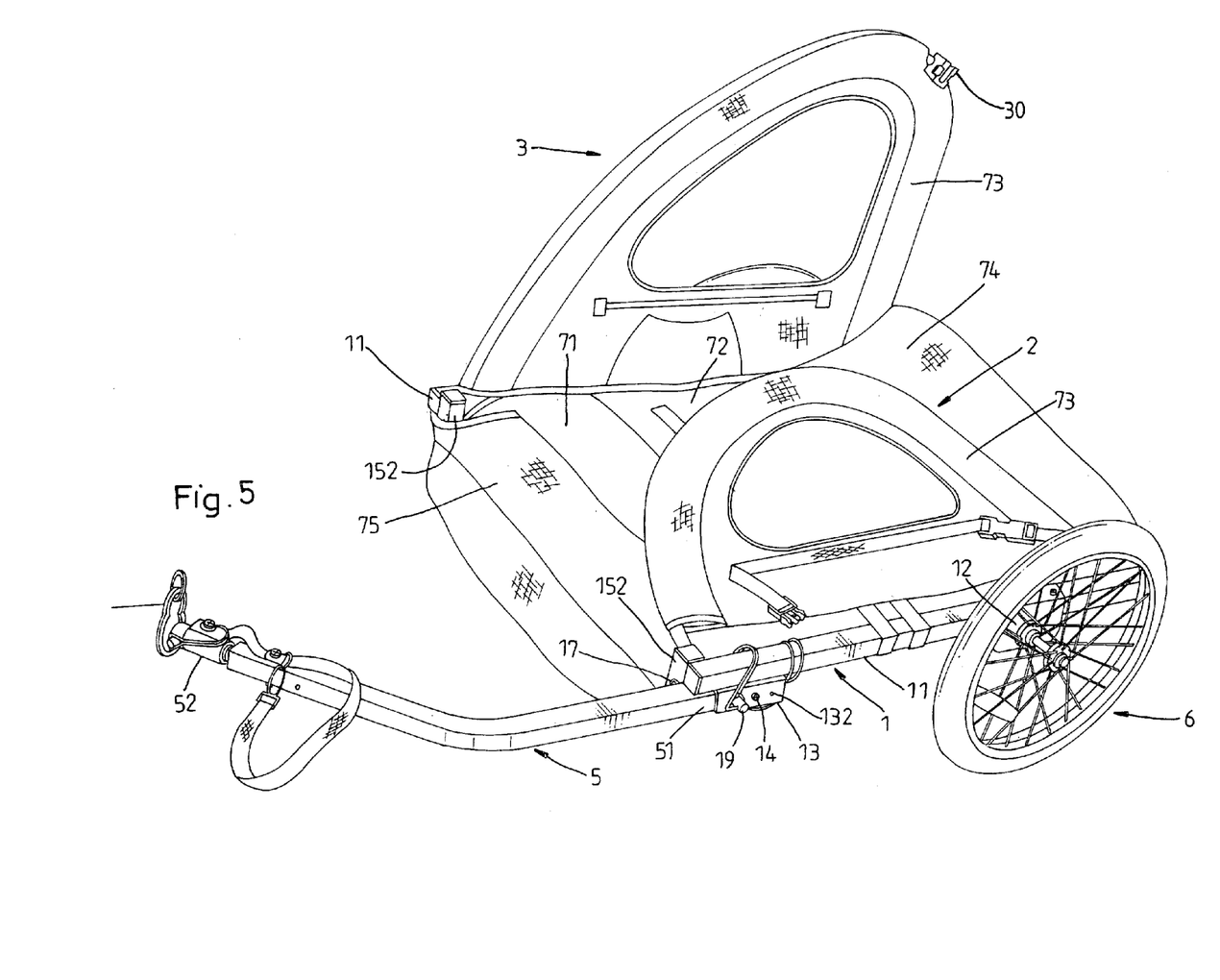
FIG. 5 is similar to FIG. 4 but showing the first upright side frame collapsed.
Figure 6:
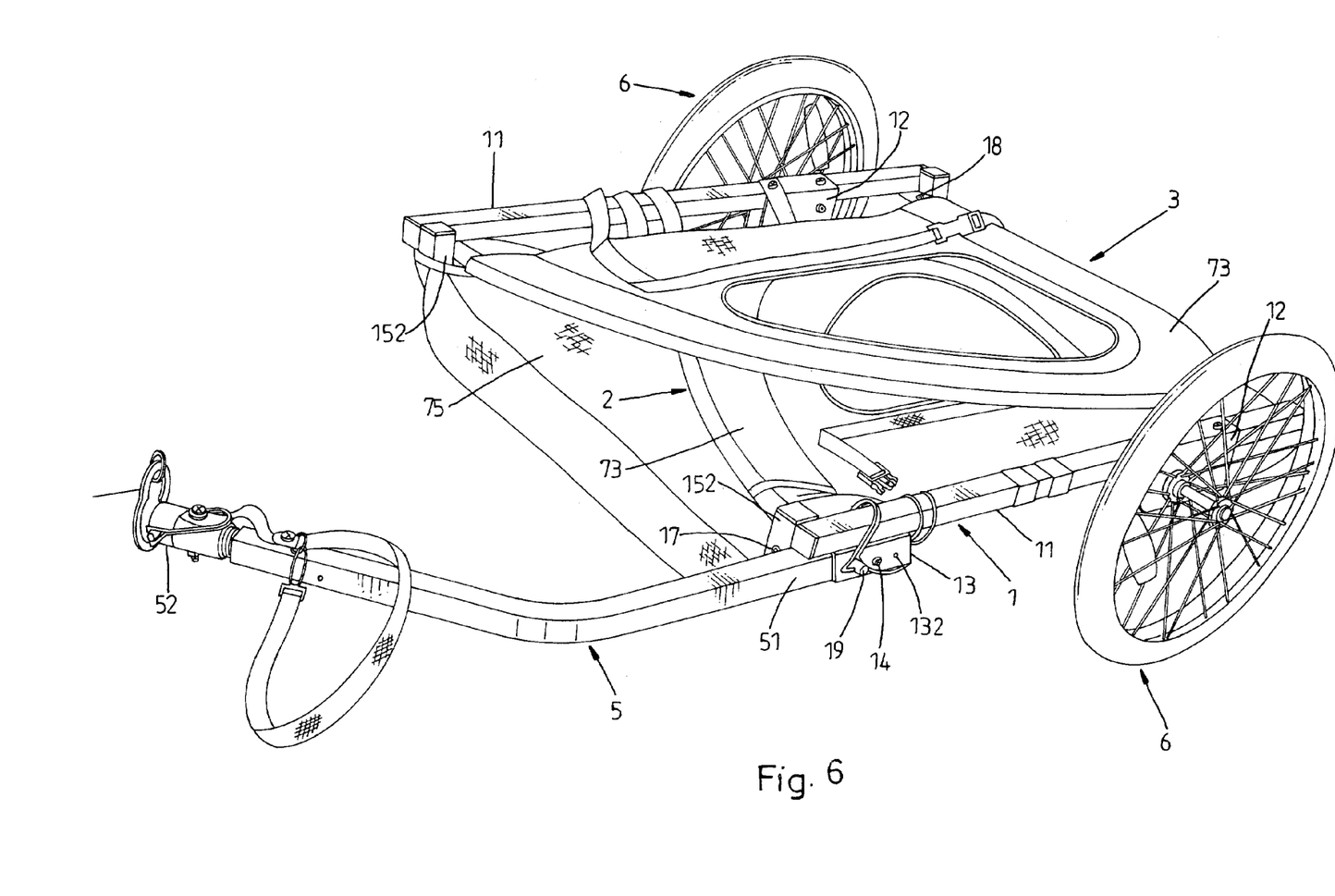
FIG. 6 is similar to FIG. 5 but showing the first upright side frame collapsed.
Figure 7:
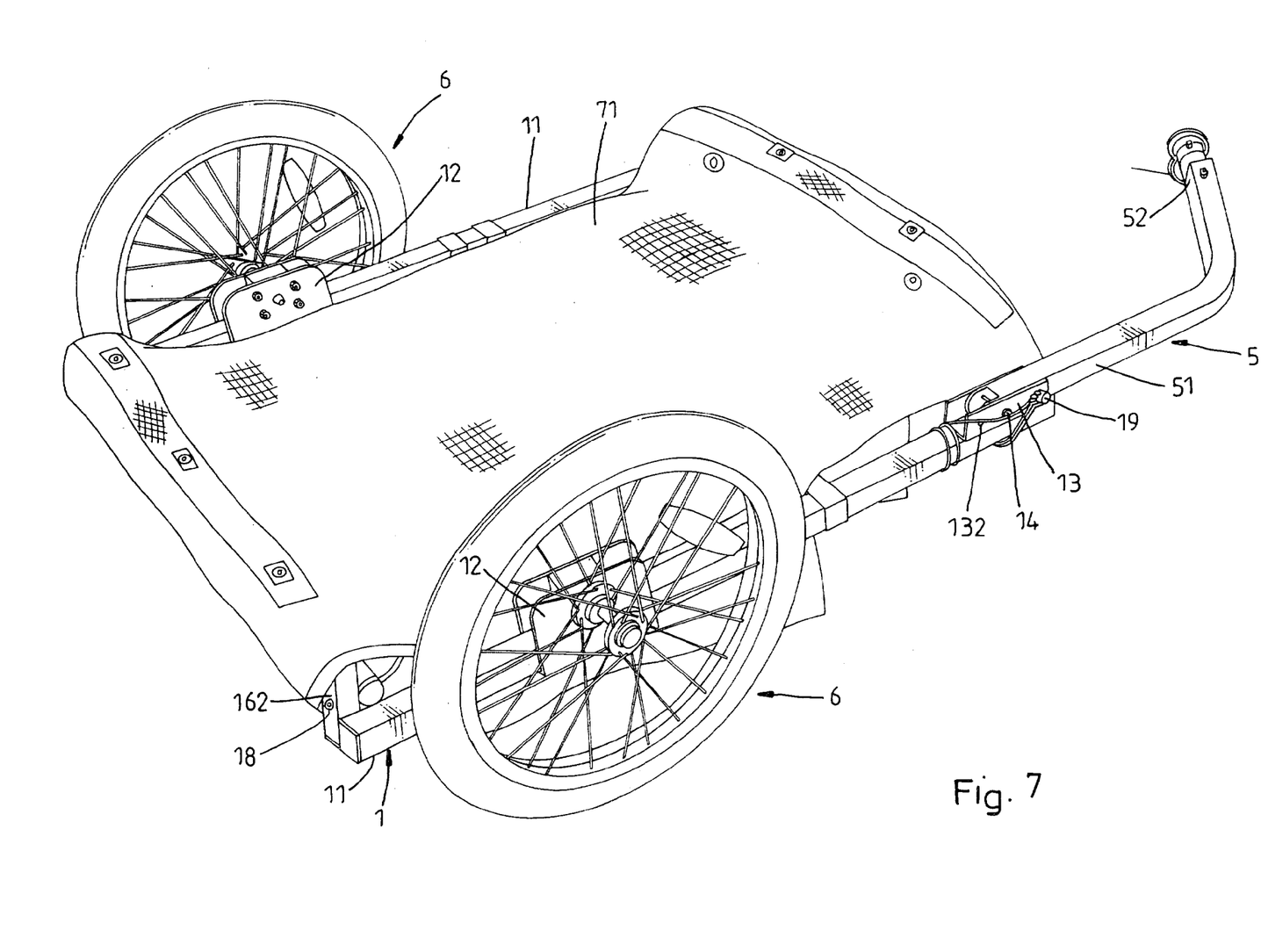
FIG. 7 is similar to FIG. 6 but viewed from another angle.
Figure 8:
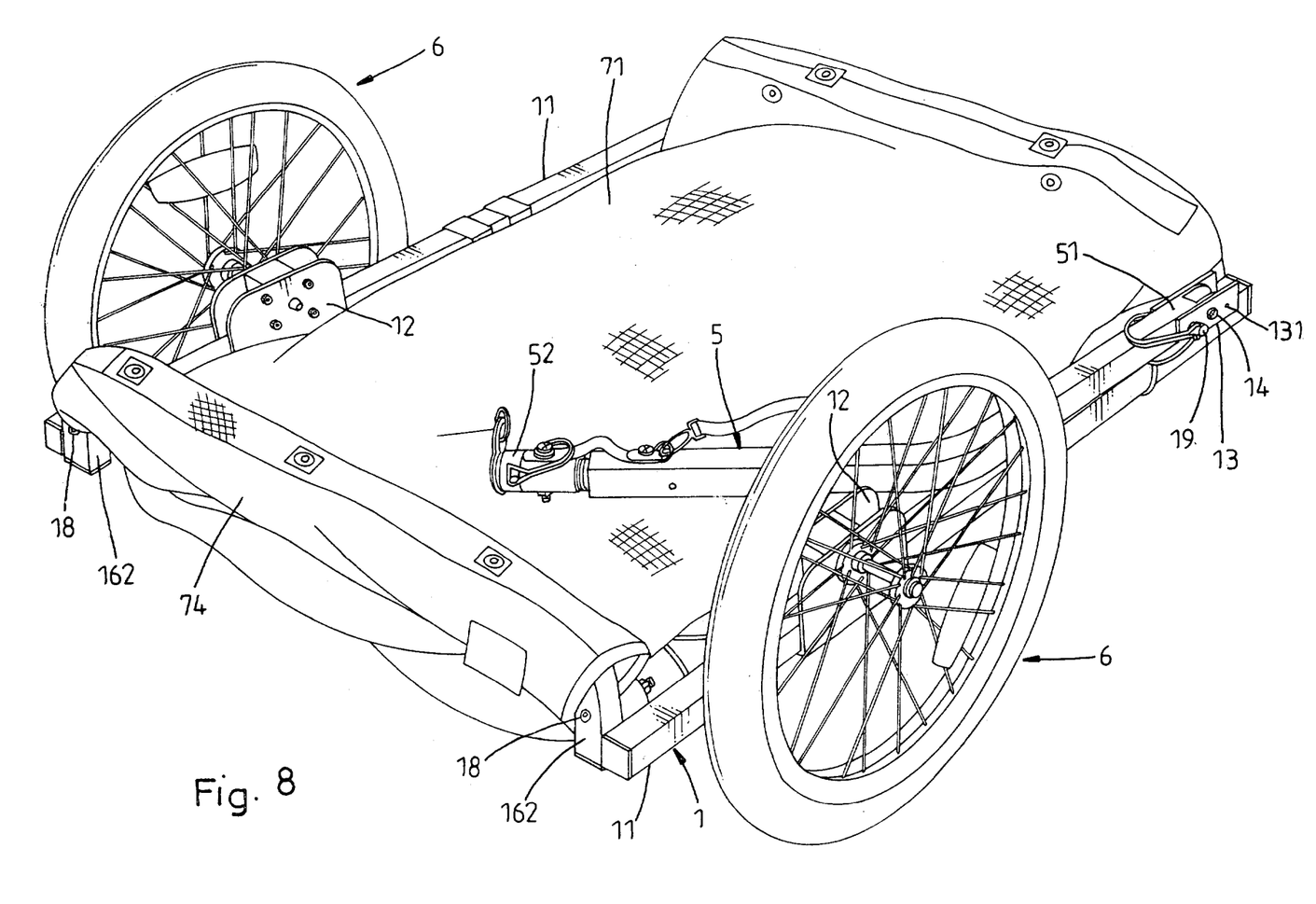
FIG. 8 is similar to FIG. 7 but showing the trailer bar locked in the received position.
Figure 9:
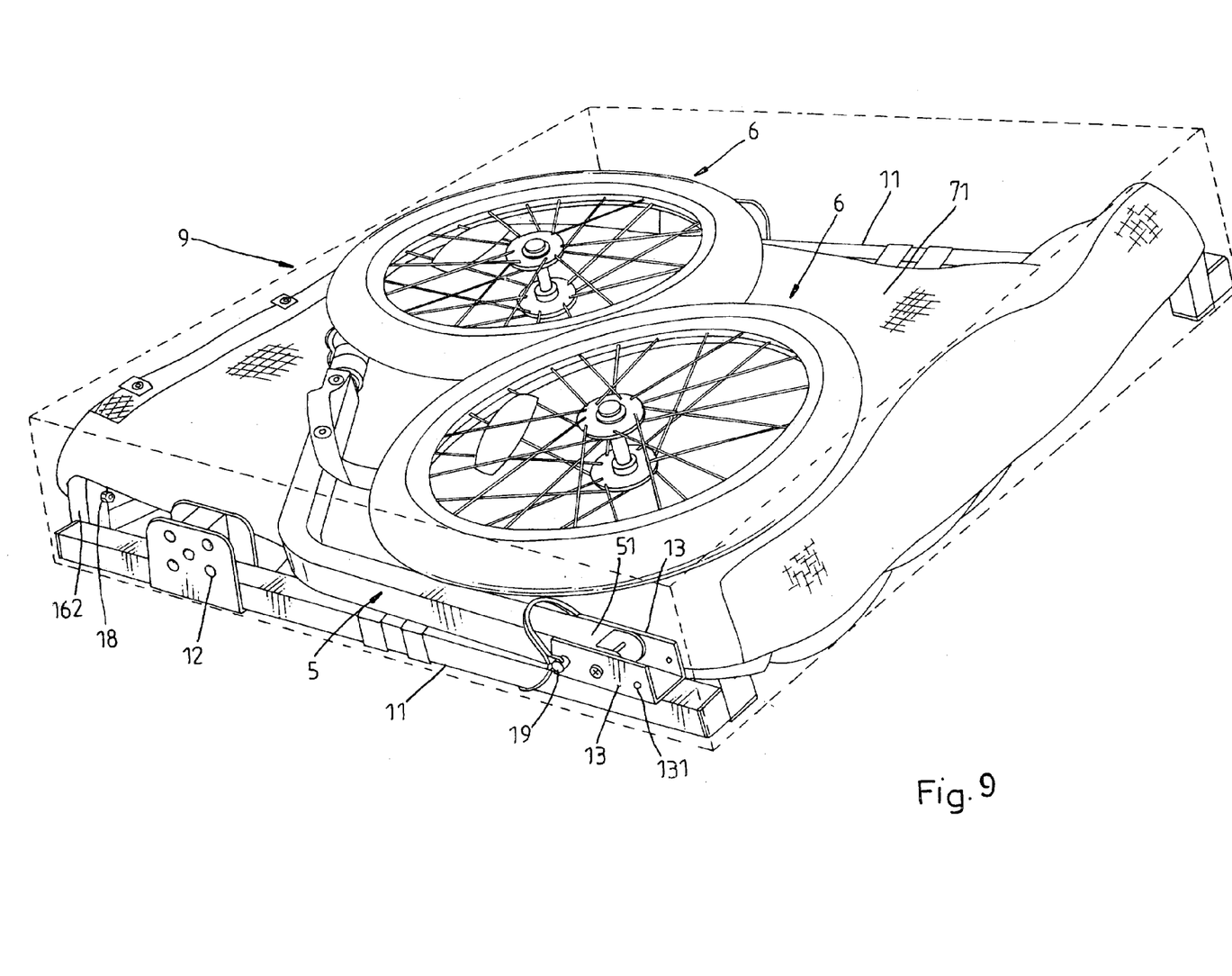
FIG. 9 illustrates the wheels detached from the wheel holder frames and attached to the collapsed baby trailer according to the present invention.
Figure 10:
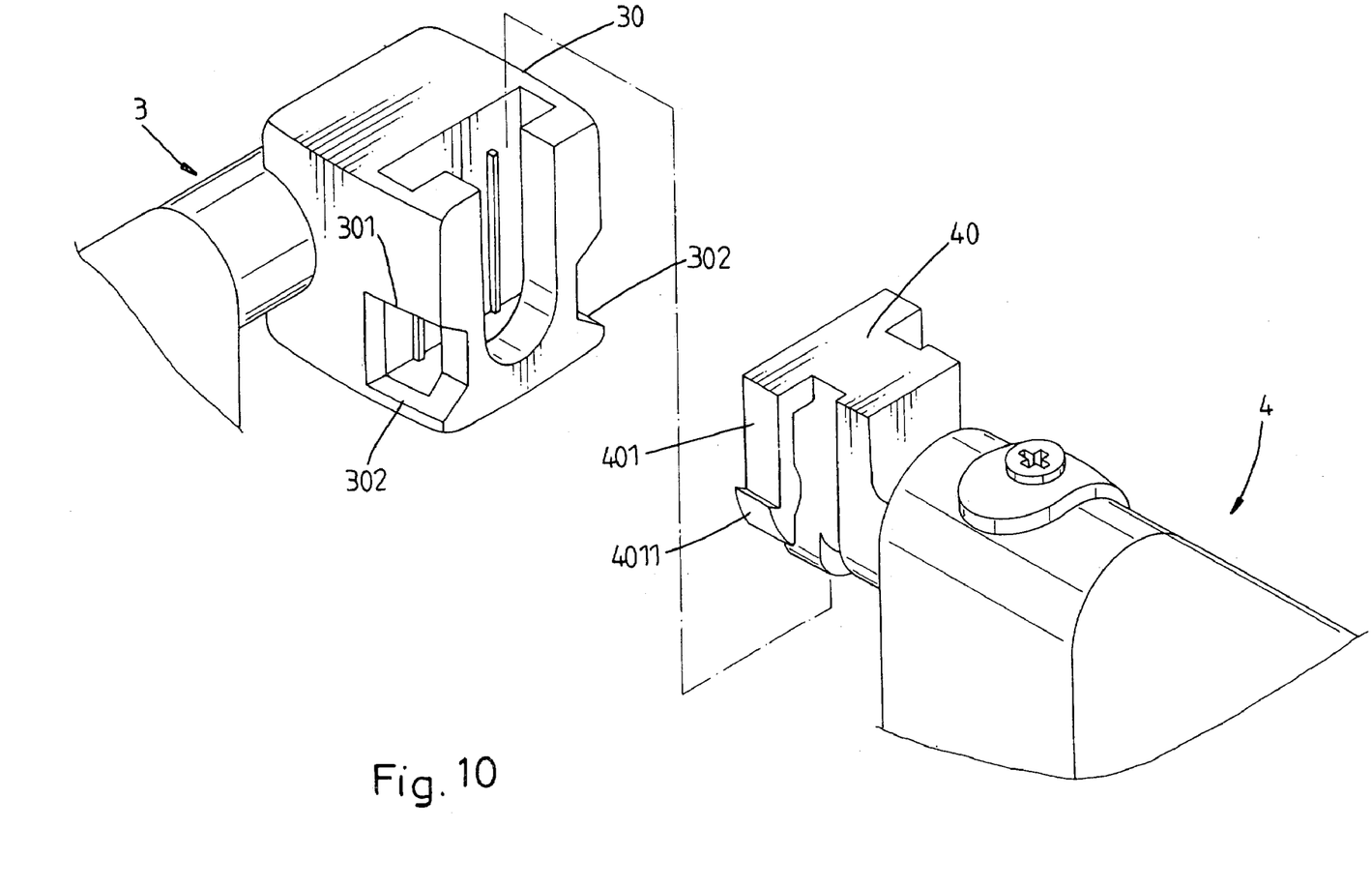
FIG. 10 is an exploded view in an enlarged scale of a part of the present invention, showing the male coupling device and the female coupling device respectively provided at the second end of the transverse top bar and the second upright side frame.
Figure 11:
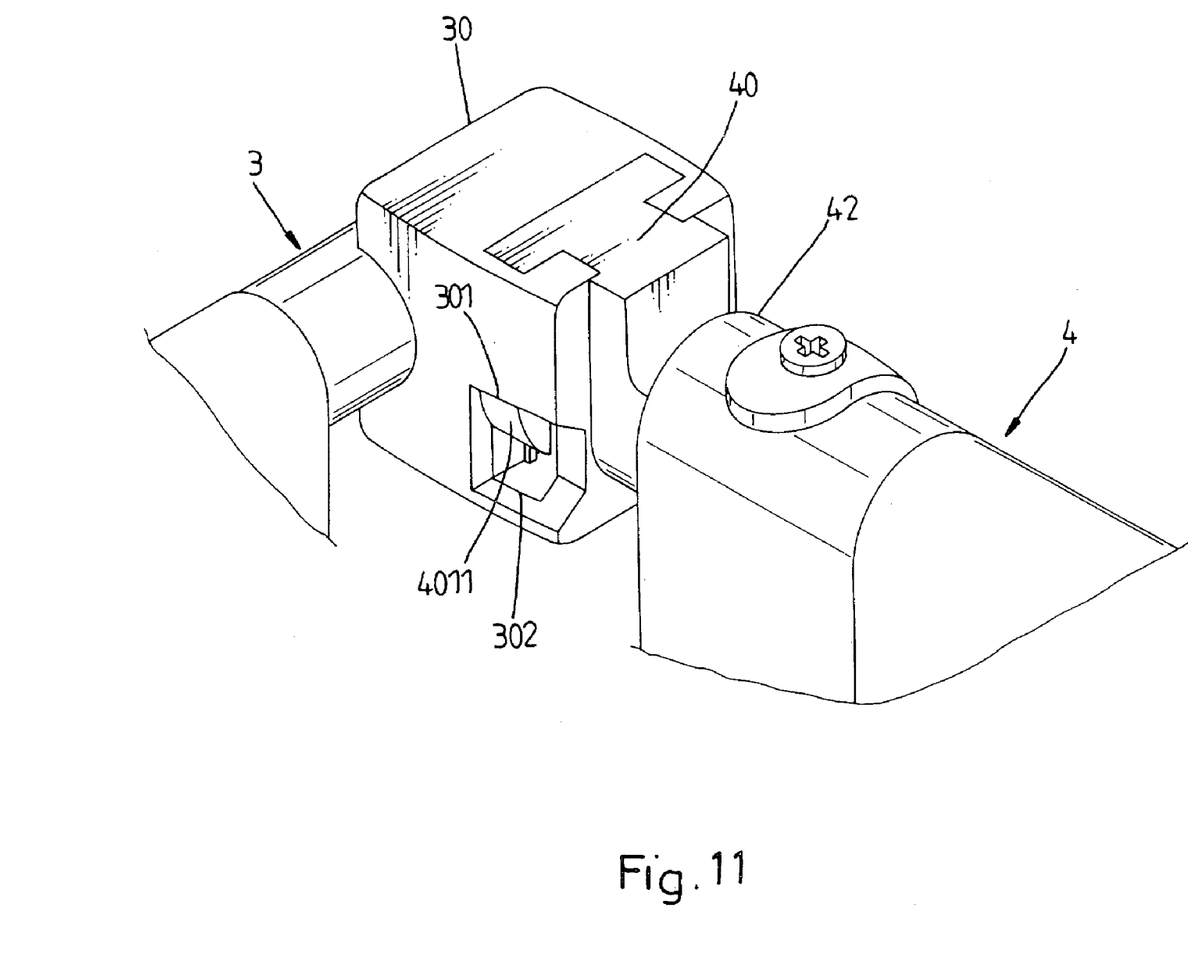
FIG. 11 is an assembly view of FIG. 10.
Figure 12:
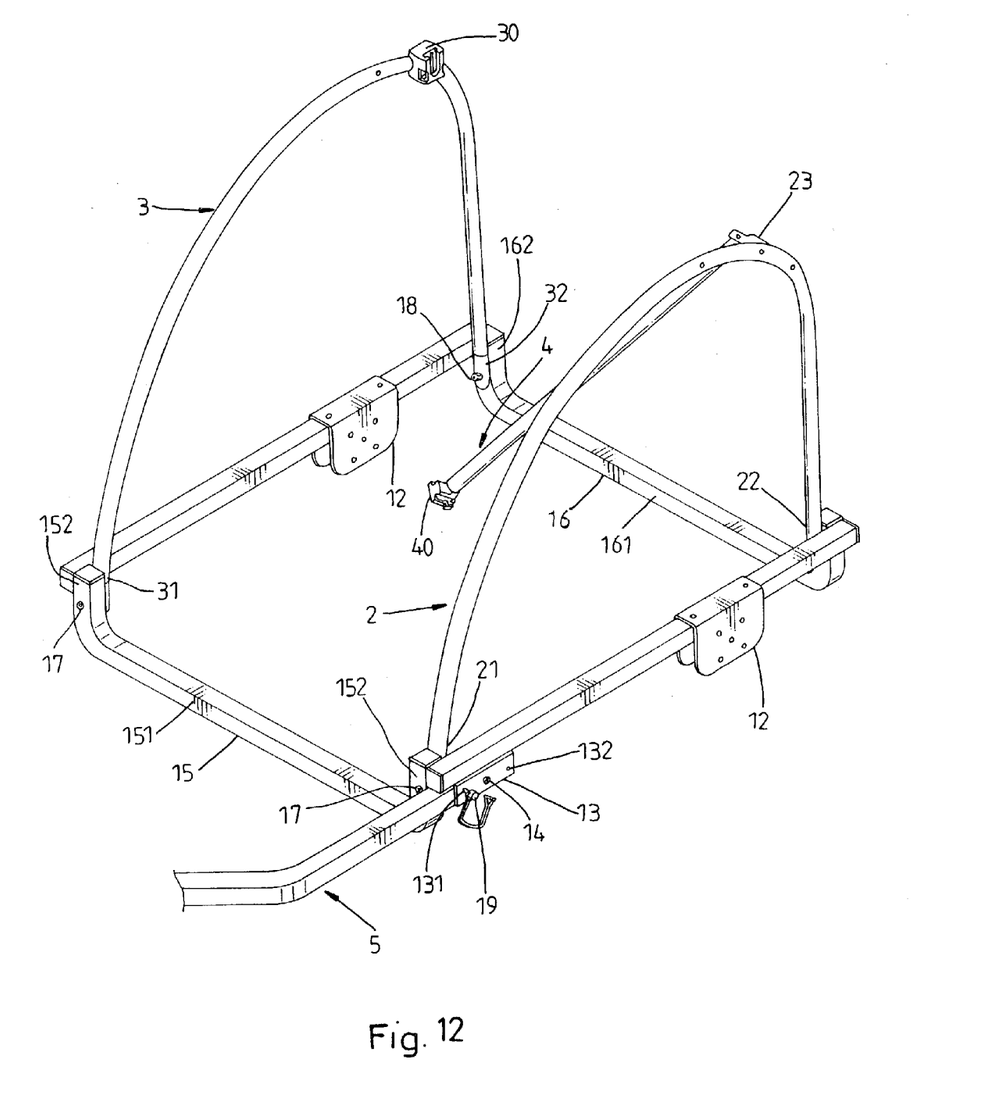
FIG. 12 is similar to FIG. 1 but showing the second end of the transverse top bar disconnected from the second upright side frame.
Figure 13:
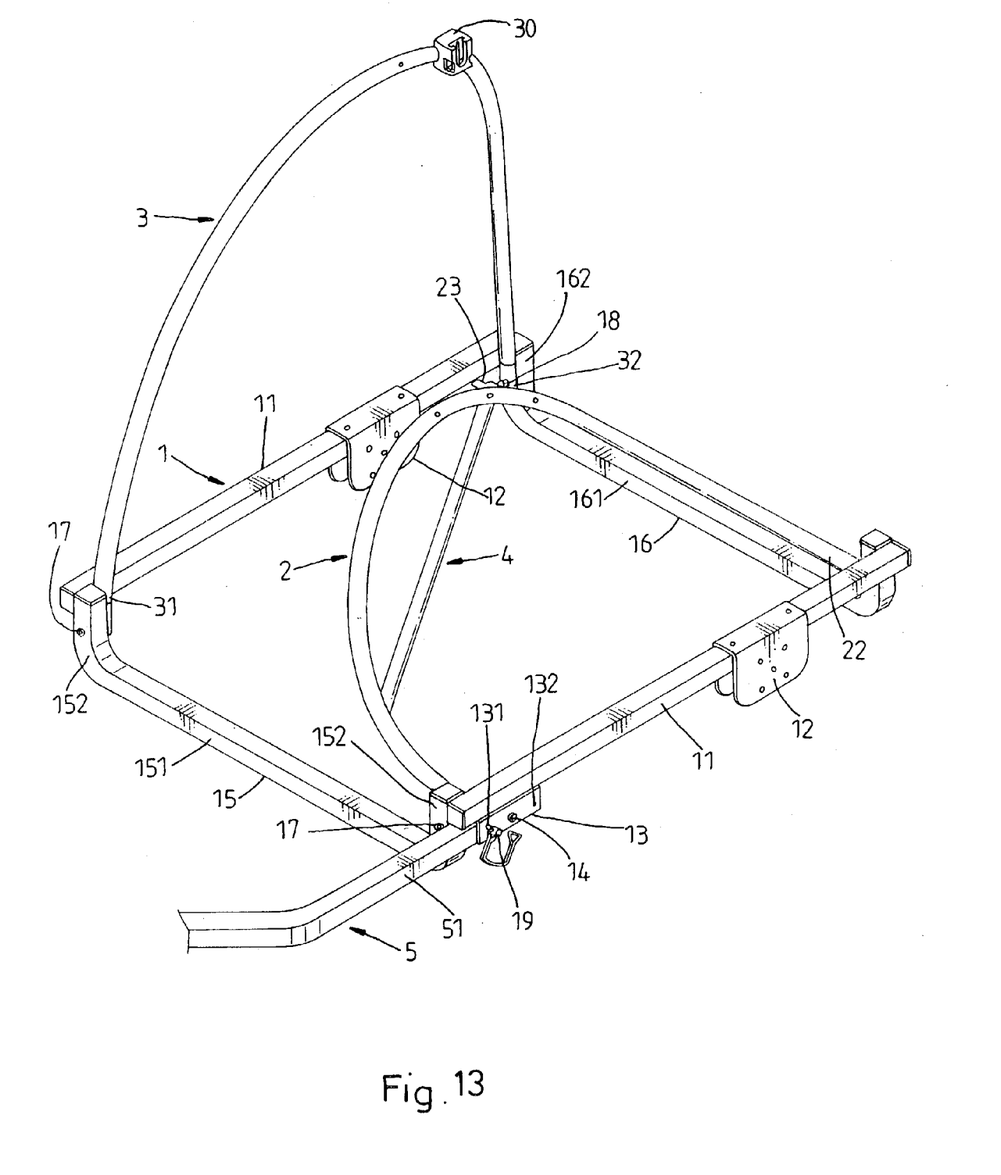
FIG. 13 is similar to FIG. 12 but showing the first upright side frame collapsed.
Figure 14:
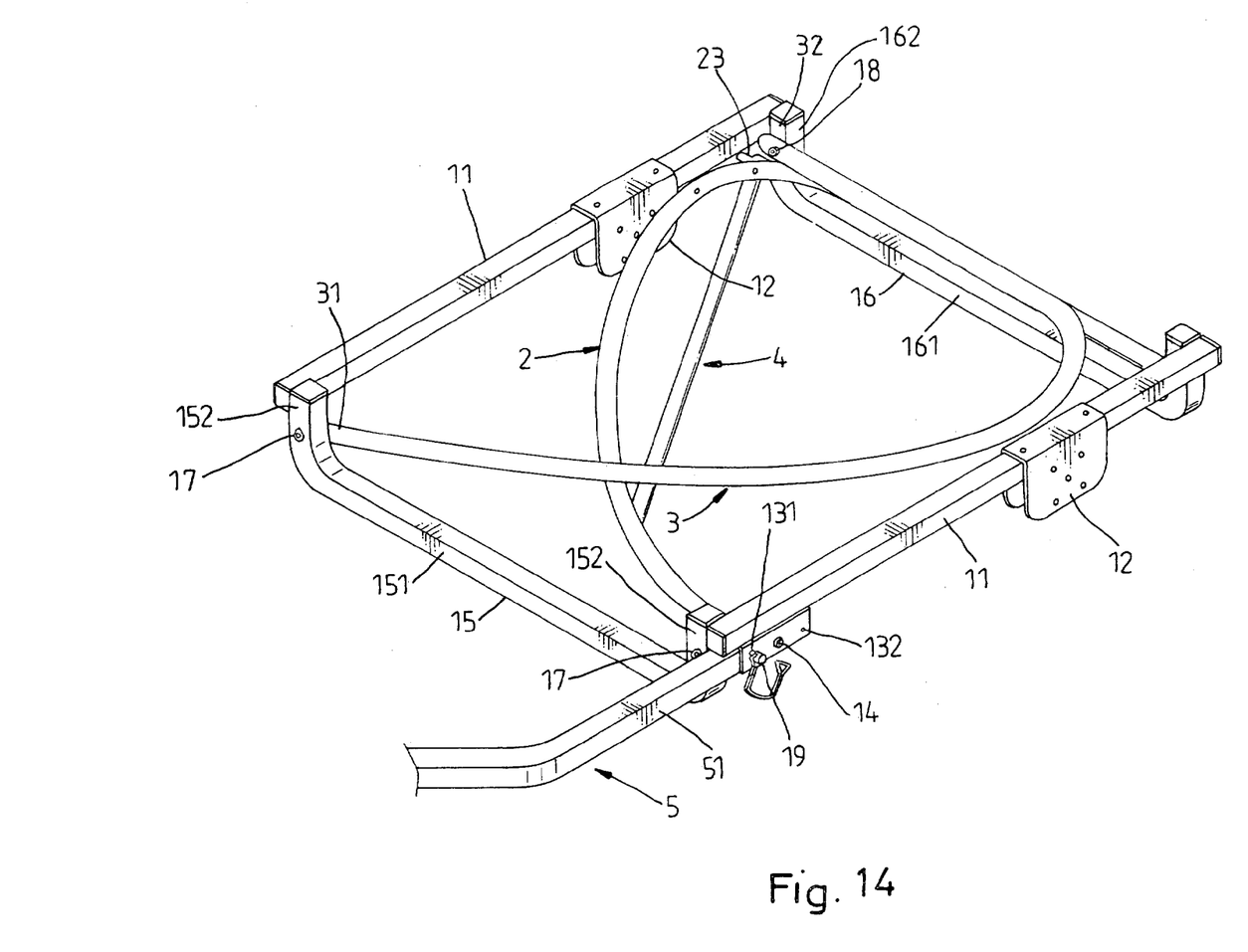
FIG. 14 is similar to FIG. 13 but showing the second upright side frame collapsed and attached to the collapsed first upright side frame.
Figure 15:
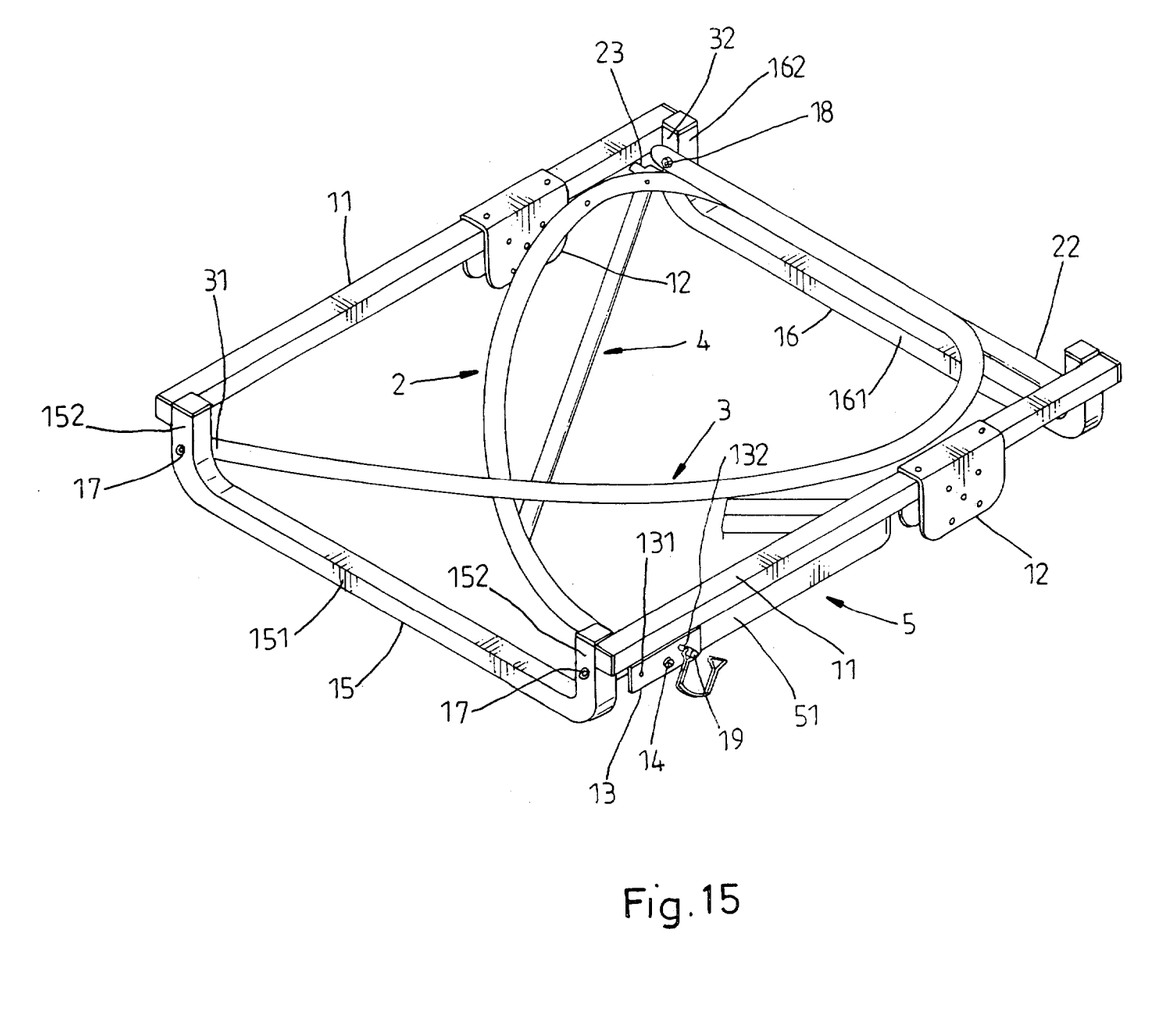
FIG. 15 is similar to FIG. 14 but showing the trailer bar locked in the received position.

The bottom frame 1 comprises two side bars 11 horizontally arranged in parallel at two sides, two wheel holder frames 12 respectively affixed to the side bars 11 to support a respective wheel 6, a channel-like lug 13 affixed to the bottom side of one side bar 11 near the front end and adapted to receive the trailer bar 5, a front bar 15 connected between the side bars 11 at the front side, and a rear bar 16 connected between the side bars 11 at the rear side. The lug 13 has a pair of front locating holes 131 and a pair of rear locating holes 132.

The upright side frames 2 and 3 are respectively formed of a substantially ⊓-shaped frame bar, each having two ends 21;22 and 31;32 respectively pivoted to the bottom frame 1. The first upright side frame 2 is fixedly mounted with a lug 23, which receives one end 41 of the transverse top bar 4.

The transverse top bar 4 has a first end 41 pivotally connected to the lug 23 at the first upright side frame 2 by a pivot 400, and a second end 42 connectable to the second upright side frame 3.

The trailer bar 5 has one end, namely, the rear end 51 pivotally connected to the lug 13 at one side bar 11 of the bottom frame 1 by a pivot 14. The other end, namely, the front end 52 of the trailer bar 5 is connectable to a baby bicycle or tricycle (not shown). The trailer bar 5 is turned about the pivot 14 between the extended position (see FIGS. 1~6) and the received position (see FIGS. 7~9). A lock pin 19 is selectively inserted into the front locating holes 131 or rear locating holes 132 to lock the trailer bar 5 in the extended or received position.

Referring to FIGS. 2~9 again, the baby trailer 10 further comprises a cloth seat 71, a cloth backrest 72, two side cover sheets 73, a cloth canopy 74, and a front cover sheet 75. When wishing to collapse the folding collapsible baby trailer 10, open the cloth canopy 74 and the front cover sheet 75 (see FIG. 3), and then disconnect the second end 42 of the transverse top bar 4 from the second upright side frame 3 for enabling the transverse top bar 4 to be turned downwards and closely attached to the first upright side frame 2 (see FIG. 4), and then the first side frame 2 is turned downwards and closely attached to the bottom frame 1 (see FIG. 5), and then the second side frame 3 is turned downwards and closely attached 6 to the first side frame 2 resting on the bottom frame 1 (see FIGS. 6 and 7), and then the lock pin 19 is disconnected from the lug 13 and the trailer bar 5, and then the trailer bar 5 is turned from the extended position to the received position and locked in the received position by the lock pin 19 (see FIG. 8), and then the wheels 6 are respectively detached from the wheel holder frames 12 and put on the collapsed baby trailer 10 for packing (see FIG. 9).

Referring to FIGS. 12~15 and FIG. 1 again, the front bar 15 and rear bar 16 of the bottom frame 1 are substantially ⊔-shaped bars each having an elongated body 151 or 161 on the middle and two angled end portions 152 or 162 at two ends of the elongated body 151 or 161. When the front and rear bars 15 and 16 affixed to the side bars 11, the elongated bodies 151 and 161 are disposed at an elevation below the side bars 11. The angled end portions 152 and 162 of the front bar 15 and rear bar 16 are respectively pivoted to the ends 21;22 and 31;32 of the upright side frames 2 and 3 by pivots 17 and 18. When the transverse top bar 4 and the upright side frames 2 and 3 are collapsed, they are received horizontally in a flat space within the bottom frame 1 above the elevation of the elongated bodies 151 and 161 of the front and rear bars 15 and 16 and below the elevation of the side bars 11. When the baby trailer 10 collapsed, the detached wheels 6 are received in the internal space of the collapsed baby trailer 10 and packed in a packing box 9 (see the imaginary line shown in FIG. 9). Further, because the elongated body 151 of the front bar 15 is relatively lower than the side bars 11, a child can get into the baby trailer 10 conveniently without kicking the front bar 15.

Referring to FIGS. 10 and 11 again, the second end 42 of the transverse top bar 4 is fixedly mounted with a male coupling device 40 detachably connectable to a female coupling device 30 at the second side frame 3. The male coupling device 40 comprises an elastic front coupling block 401. The elastic front coupling block 401 has two hooked portions 4011 at two sides. The female coupling device 30 comprises a coupling hole 301 adapted to receive the elastic front coupling block 401 of the male coupling device 40, and two retaining holes 302 disposed at two sides of the coupling groove 301 and adapted to retain the hooked portions 4011 of the male coupling block 40. When insert the elastic front coupling block 401 of the male coupling block 40 into the coupling groove 301 of female coupling device 30, the hooked portions 4011 are respectively engaged into the retaining holes 302 to secure the male coupling device 40 to the female coupling device 30 firmly. When squeezing the hooked portions 4011 of the male coupling device 40 inwards, the elastic front coupling block 401 can then be disconnected from the coupling groove 301 of the female coupling device 30, for enabling the transverse top bar 4 to be collapsed.

As indicated above, the invention has the following advantages:

1. Because the elongated bodies 151 and 161 of the front and rear bars 15 and 16 are disposed below the elevation of the side bars 11 and the angled end portions 152 and 162 of the front bar 15 and rear bar 16 are respectively pivoted to the ends 21;22 and 31;32 of the upright side frames 2 and 3 by pivots 17 and 18, the transverse top bar 4 and the side frames 2 and 3 are received in a flat horizontal space above the elevation of the elongated bodies 151 and 161 of the front and rear bars 15 and 16 below the elevation of the side bars 11 when collapsed. Therefore, the folding collapsible baby trailer 10 occupies less storage space when collapsed.

2. Because the elongated body 151 of the front bar 15 is suspended below the elevation of the side bars 11, a child can conveniently get into the inside of the folding collapsible baby trailer 10 without kicking the front bar 15.

What is claimed is:

1. A folding collapsible baby trailer comprising:
   a bottom frame, said bottom frame comprising two side bars horizontally arranged in parallel at two sides, two wheel holder frames respectively affixed to said side bars to support a respective wheel, a channel-like lug affixed to a bottom side of one side bar near a front end, said channel-like lug having a pair of front locating holes and a pair of rear locating holes, a front bar connected between said side bars at a front side, and a rear bar connected between said side bars at a rear side;
   a first upright side frame and a second upright frame respectively formed of a substantially ⊓-shaped frame bar, said first and second upright frames each having two ends respectively pivoted to said bottom frame, said first upright side frame having a lug fixedly mounted thereof;
   a transverse top bar, said transverse top bar having a first end pivotally connected to the channel-like lug at said first upright side frame by a pivot and a second end connectable to said second upright side frame;
   a trailer bar fastened pivotally with the lug at one side bar of said bottom frame and turned between an extended position and a received position, said trailer bar having a rear end pivoted to the channel-like lug at one side bar of said bottom frame and a front end connectable to a baby vehicle;
   a lock pin selectively inserted into the front locating holes and rear locating holes of the channel-like lug at one side bar of said bottom frame to selectively lock said trailer bar between said extended position and said received position;
   a cloth seat fastened to said bottom frame;
   a cloth backrest fastened to said transverse top bar;
   two side cover sheets respectively covered on said first and second upright side frames;
   a cloth canopy fastened to said transverse top bar; and
   a front cover sheet fastened to said bottom frame at a front side;
   wherein said front bar and rear bar of said bottom frame are substantially ⊔-shaped bars each having an elongated body disposed on the middle below the elevation of said side bars of said bottom frame and two angled end portions respectively extended from two ends of said elongated body and respectively pivoted to the ends of said first and second upright side frames so that a flat horizontal space is defined above the elongated bodies of said front and rear bars of said bottom frame and below the elevation of the side bars of said bottom frame for receiving said transverse top bar and said first and second upright side frames when the folding collapsible baby trailer collapsed.

2. The folding collapsible baby trailer as claimed in claim 1, further comprising a male coupling device fixedly fastened to the second end of said transverse top bar and a female coupling device fixedly provided at a said second side frame and adapted to receive said male coupling device, said male coupling device comprising an elastic front coupling block, said elastic front coupling block having two hooked portions at two sides, said female coupling device comprising a coupling hole adapted to receive said elastic front coupling block of said male coupling device and two retaining holes disposed at two sides of said coupling groove and adapted to retain the hooked portions of said male coupling block.

* * * * *